United States Patent [19]

Fukuda

[11] Patent Number: 4,893,566
[45] Date of Patent: * Jan. 16, 1990

[54] GOLF CART SYSTEM

[76] Inventor: Tomiichi Fukuda, 3-23-18, Denenchofu, Ohta-ku, Tokyo, Japan

[*] Notice: The portion of the term of this patent subsequent to Jan. 9, 2004 has been disclaimed.

[21] Appl. No.: 130,631

[22] Filed: Dec. 9, 1987

[30] Foreign Application Priority Data

Dec. 11, 1986 [JP] Japan .................... 61-295167

[51] Int. Cl.⁴ ............................................. B61F 13/00
[52] U.S. Cl. ................................................... 104/140
[58] Field of Search ................. 104/139, 140, 142–144, 104/242–247; 105/141

[56] References Cited

U.S. PATENT DOCUMENTS

| 432,204 | 7/1890 | McLaughlin | 104/139 |
| 1,679,068 | 7/1928 | Allen et al. | 104/139 X |
| 1,847,976 | 3/1932 | Oldham | 104/140 |
| 3,099,227 | 7/1963 | Bryan | 104/139 |
| 3,583,322 | 6/1971 | Vykukal | 104/1 |
| 3,838,648 | 10/1974 | Dahlberg et al. | 104/139 |
| 3,859,925 | 1/1975 | Hartz | 104/139 |
| 3,906,866 | 9/1975 | Knippel | 104/139 |
| 4,036,146 | 7/1977 | Tyus | 104/139 X |
| 4,592,284 | 6/1986 | Fukuda | 104/140 |
| 4,671,184 | 6/1987 | Fukuda | 104/140 X |

FOREIGN PATENT DOCUMENTS

| 2148373 | 9/1971 | Fed. Rep. of Germany . |
| 61-33363 | 2/1986 | Japan . |
| 1354888 | 5/1974 | United Kingdom . |
| 1367119 | 9/1974 | United Kingdom . |
| 1386655 | 3/1975 | United Kingdom . |
| 1594068 | 4/1977 | United Kingdom . |
| 2158404 | 11/1985 | United Kingdom . |

Primary Examiner—Margaret A. Focarino
Assistant Examiner—Frank H. Williams, Jr.
Attorney, Agent, or Firm—Fleit, Jacobson, Cohn, Price, Holman & Stern

[57] ABSTRACT

A golf cart system which can be installed on the fairway of a golf course. The cart system has improved power economy and anti-rolling and anti-pitching motions of the cart. The golf cart system includes a track embedded in the ground and a cart adapted to run on the track. According to the golf cart system, since the track exposed at the ground is very narrow, there is less chance of a golf ball hitting against the track. Even if a golf ball should happen to accidentally hit the exposed track portion, the ball will bounce similarly as when striking on natural grass if the exposed track portion is covered by elastic members such as artificial turf. This makes it possible to install the golf cart system on the fairway of a golf course. In addition, the rolling motion of the cart is effectively prevented by the first and second anti-rolling rollers. Especially, the provision of the second anti-rolling rollers enables to effectively prevent the rolling motion of the cart, since they are positioned most away from the center of gravity of the cart and can generate a large anti-rolling moment. The pitching motion of the cart is also effectively prevented by the anti-pitching rollers. Thus the provision of the anti-pitching rollers makes it possible to install the golf cart system in a golf course abundant in.

1 Claim, 6 Drawing Sheets

FIG.6
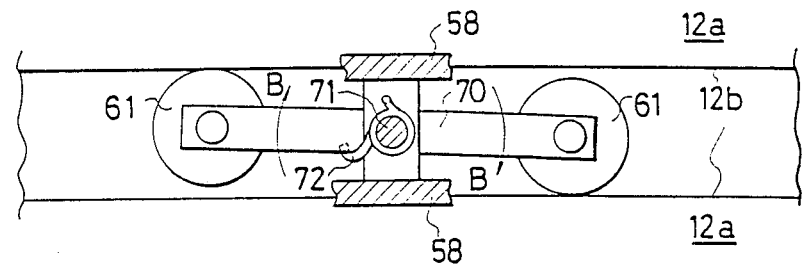
FIG.7(a)
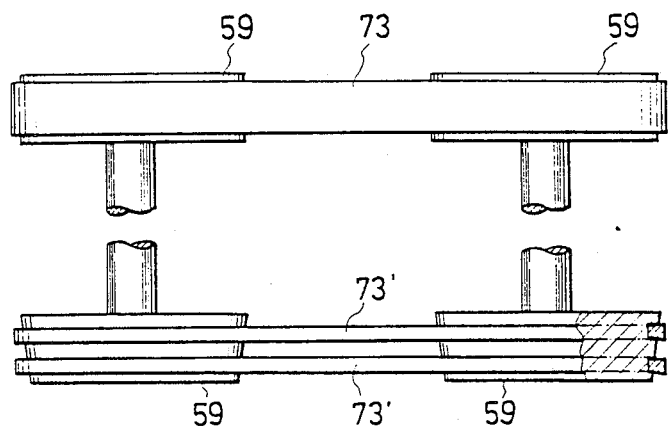
FIG.7(b)

GOLF CART SYSTEM

BACKGROUND OF THE INVENTION

The present invention relates to a golf cart system for installation on a golf course and, more particularly, to a golf cart system which enables a golf cart to run on the fairway of a golf course.

Heretofore several types of golf carts for carrying golfers or golf equipment have been known. These include, for example, three- and four-wheeled carts driven by a battery-powered electric motor or a small internal combustion engine. However, these carts are not suitable to be run on a golf course especially a fairway because their tires would come into direct contact with the grass and would likely damage the grass. Accordingly, they have to be run on the rough or on a paved path running at the side of the rough. Recently there have been developed golf cart systems adapted to run on rails embedded in the ground of a golf course. These cart systems do not damage the grass, but since they use rails having a wide top surface exposed above the ground of a golf course, there is a risk that the rails will interfere with the golfers' game when a golf ball lands on the exposed rail surface. Thus the golf cart systems of the prior art using embedded rails also have to be installed at a place outside the rough.

When a golf cart system is installed at a place outside the rough and far from the fairway, the golfers or their caddies have to walk back and forth between the fairway and the cart whenever they change golf clubs. This is not only troublesome for the golfers and caddies but also delays the progress of the game.

For solving this problem, the applicant of the present application previously developed a novel embedded-rail type golf cart system which can be installed on the fairway as disclosed, for example, in Japanese Laid-open Patent Publication No. 33363/1986. This golf cart system uses a track having a very narrow top surface exposed above the ground so that there is little chance of a golf ball hitting against the track even though the track is laid across the fairway.

The golf cart system disclosed in Japanese Laid-open Patent Publication No. 33363/1986 is shown in FIG. 8 and comprises a track 1 and a cart 2. Vertically and downwardly extending posts 3 are secured to a base frame 2a of the cart 2 and mount thereon driving wheels 4 and anti-rolling rollers 5 for preventing the rolling motion of the cart 2. A battery and an electric motor (or a small internal combustion engine) for driving the wheels 4 are accommodated within a housing 2b. The driving wheels 4 run on lower inner surfaces 1a of the track 1 and the anti-rolling rollers 5 run on upper inner surfaces 1b of the track 1. For applying the anti-rolling force to the cart 2, the rollers 5 are always strongly urged against the upper inner surfaces 1b by springs 6.

With this construction, a heavy load (not only the dead weight of the cart 2 itself but also the reaction force of the springs 6) is always applied between the driving wheels 4 and the lower running surfaces 1a (i.e. inner surfaces of the bottom wall of the track) of the track 1. This causes an excessive frictional force therebetween and also wastefully increases the consumption of the battery power or the gasoline used for driving the cart 2, as a result, the distance that the cart 2 can travel per charge of the battery or per tank of gasoline is shortened.

Another problem of this golf cart system is that the power anti-rolling by the rollers 5 is not sufficient and therefore cart 2 is liable to be turned radially outward due to the centrifugal force when it travels on a curved portion of the track.

SUMMARY OF THE INVENTION

It is an object of the present invention to provide a golf cart system which can be used on the fairway of a golf course and which is excellent in power efficiency and in anti-rolling and anti-pitching effects.

For achieving the object of the present invention, there is provided, according to the present invention, a golf cart system including a track embedded in the ground and a cart adapted to run on the track characterized in that: said track comprises a generally horizontally extending bottom wall, two opposed side walls each generally vertically extending from the bottom wall, two top walls each extending from the upper end of each side wall toward the center of the track, a top groove defined between the top walls, and a bottom groove defined between the inner surfaces of the bottom wall; said cart comprises a base frame, supporting posts vertically and downwardly extending from the base frame through the top groove into the interior of the track, a wheel supporting frame mounted on the supporting posts and being movable within the track, driving wheels mounted on the wheel supporting frame and driven by a power source to run on the inner surfaces of the bottom wall of the track, first anti-rolling rollers mounted on the wheel supporting frame to run on the inner surfaces of the side walls, and second anti-rolling rollers mounted on the wheel supporting frame to run within the bottom groove of the bottom wall.

Further according to the present invention, there is provided a golf cart system including a track embedded in the ground and a cart adapted to run on the track characterized in that: said track comprises a generally horizontally extending bottom wall, two opposed side walls each generally vertically extending from the bottom wall, two top walls each extending from the upper end of each side wall toward the center of the track, a top groove defined between the top walls, and a bottom groove defined between the inner surfaces of the bottom wall; said cart comprises a base frame, supporting posts vertically and downwardly extending from the base frame through the top groove into the interior of the track, a wheel supporting frame mounted on the supporting posts and being movable within the track, driving wheels mounted on the wheel supporting frame and driven by a power source to run on the inner surfaces of the bottom wall of the track, first anti-rolling rollers mounted on the wheel supporting frame to run on the inner surfaces of the side walls, second anti-rolling rollers mounted on the wheel supporting frame to run within the bottom groove of the bottom wall, and anti-pitching rollers mounted on the wheel supporting frame to run on the inner surfaces of the top walls.

Since the golf cart system of the present invention is provided with first and second anti-rolling rollers which are not urged against the upper running surfaces of the track (i.e. inner surfaces of the top walls), only the dead weight of the cart itself is applied between the driving wheels and the lower running surfaces of the track (i.e. inner surfaces of the bottom walls). This reduces the frictional force therebetween and also saves the consumption of the battery power or the gasoline used for driving the cart, as a result, the distance that the cart can travel per charge of the battery or per tank of gasoline is extended.

In addition, since the second anti-rolling rollers running within the bottom groove are positioned the furthest away from the center of gravity of the cart for effectively generating an anti-rolling moment resistant to the rolling moment of the cart, the rolling of the cart is very effectively prevented.

Also according to another embodiment of the present invention, the golf cart system is provided with anti-pitching rollers, it is able to effectively prevent the pitching motion of the cart when it travels along the terrain of a golf course. Since the anti-pitching rollers are not strongly urged against the upper inner surfaces of the track, no excessive frictional force is caused between the driving wheels and their running surface.

BRIEF DESCRIPTION OF THE INVENTION

Other objects and advantages of the present invention will become apparent from the following detailed description of a preferred embodiment of the present invention taken in reference to the accompanying drawings in which:

FIG. 6 is a schematic plan view showing one example of a method for mounting second anti-rolling rollers to a wheel supporting frame of the cart;

FIG. 7a and 7b are a partial plan view showing modifications of driving wheels around which belt or belts are wound; and, FIG. 8 is a cross-sectional side elevation showing a golf cart system of the prior art.

DESCRIPTION OF THE PREFERRED EMBODIMENT

Figure 1:
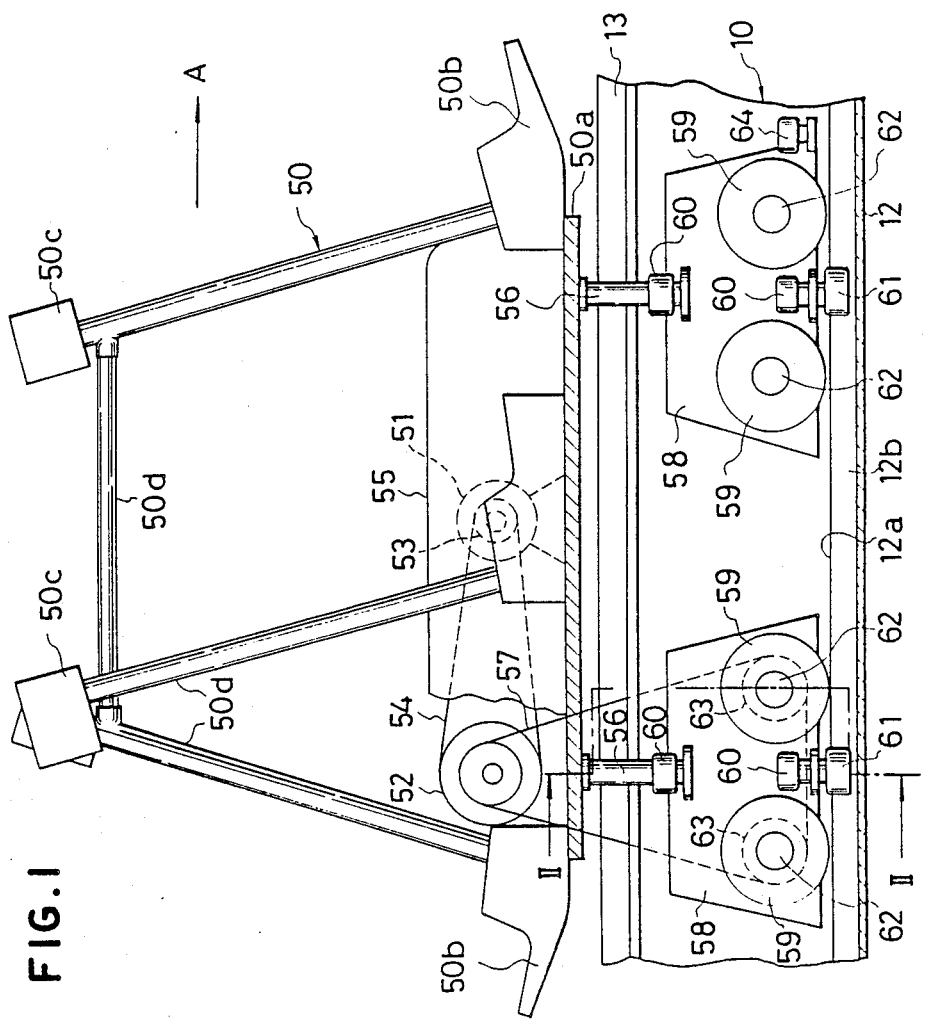
FIG. 1 is a cross-sectional side elevation of a first embodiment of a golf cart system of the present invention schematically showing the structure of a cart and a track thereof.
Figure 2:
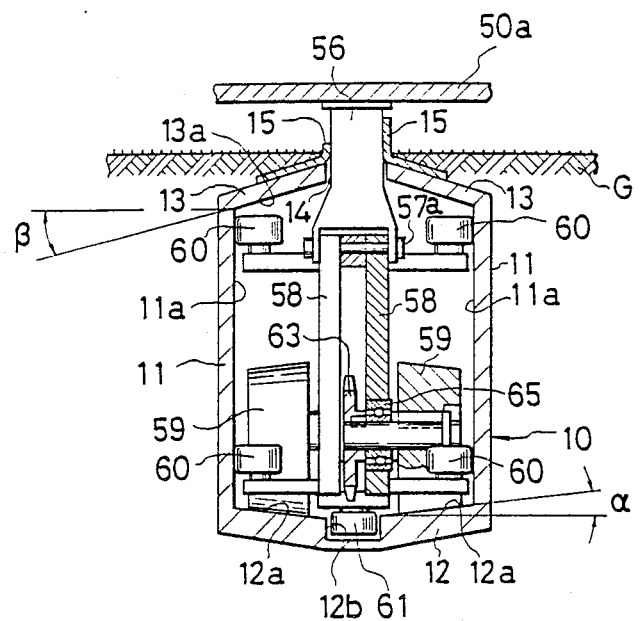
FIG. 2 is a cross-sectional view taken along the line II—II of FIG. 1.
Figure 5A:
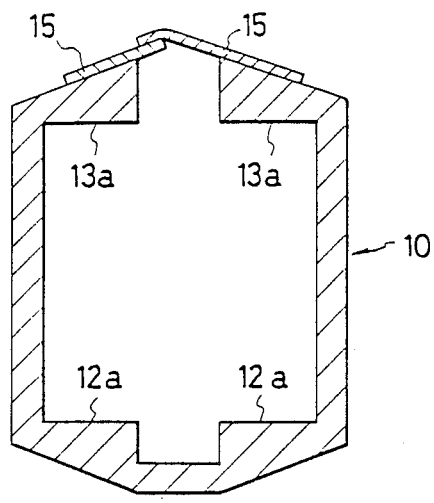
FIGS. 5a and 5b are an explanatory view showing a method for mounting groove covers to the track.
Figure 5B:
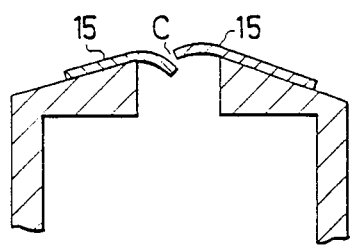
Figure 8:
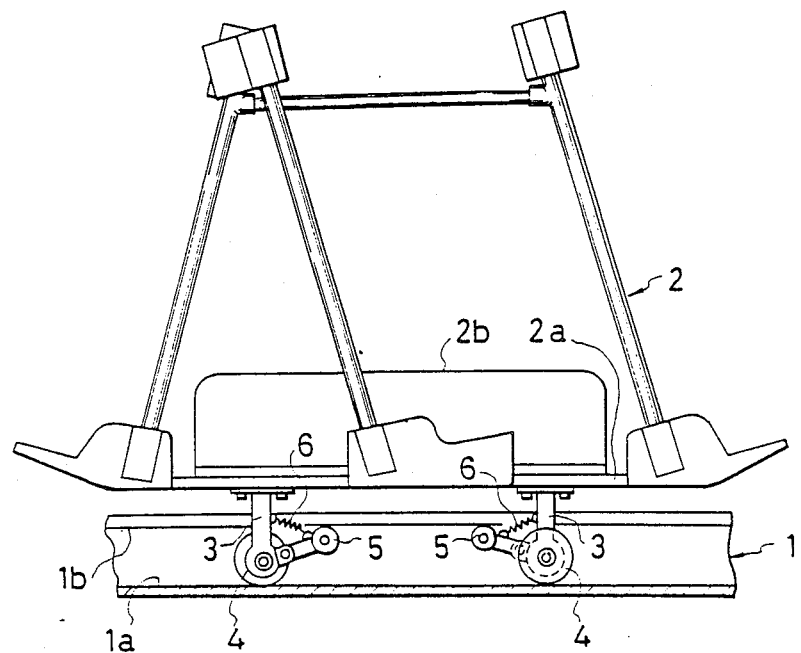

As shown in FIGS. 1 and 2, a golf cart system of the present invention includes a track 10 and a cart 50 which runs along the track 10. The detailed structure of the track 10 will be described with reference to FIG. 2 which shows a cross-sectional configuration thereof. The width of a track portion exposed above the ground (grass surface) G is very narrow and therefore there is little chance of a golf ball hitting against the track 10 even if the track 10 is embedded in the fairway of a golf course. This makes it possible to install the golf cart system of the present invention on the fairway of the golf course. The track 10 comprises a generally horizontally extending bottom wall 12, two opposed side walls 11 each generally vertically extending from the bottom wall 12, two top walls 13 each extending from the upper end of each side wall 11 toward the center of the track 10. A slot or top groove 14 is defined between the top walls 13, and a bottom groove 12b is defined between inner surfaces 12a of the bottom wall 12. It is preferable to mount, on the external surfaces of the top walls 13, covers 15 of suitable elastic material such as rubber or artificial turf to cover the top groove 14. The provision of the groove covers 15 makes it possible to prevent irregular bonding bouncing of golf balls if they should accidentally hit the track 10 and also prevents the entry of dirt or other debris such as dead leaves into the track 10. The groove covers 15 are usually in closed condition but are opened by posts 56 of the cart 50 as shown in FIG. 2 when the cart 50 moves along the track 10. In order to keep the top groove 14 surely closed by the covers 15, it is preferable to differentiate the length of covers 15 projecting from right and left sides of the groove 14 and also to lay the longer one on the shorter one as shown in FIG. 5(a). This makes it possible to surely prevent the entry of dirt or other debris into the track 10, since the longer cover which is liable to sag is always firmly supported by the shorter cover which is stiff and does not easily bend. On the contrary, if the length of both covers 15 is equalized as shown in FIG. 5(b), both covers 15 are liable to sag and a gap C through which the debris will be entered into the track 10 is formed therebetween.

The cart 50 has a base frame 50a on which supporting beds 50b and pillows 50c for supporting golf bags and other golf equipment are mounted via pipe frames 50d. The cart 50 shown is designed for carrying only golf equipment, however, other types of carts for passengers or for both passengers and golf equipment may be designed. The base frame 50a also supports thereon a power source such as an electric motor (or a small internal combustion engine) 51 for driving the cart 50 and an intermediate pulley (or sprocket) 52. A belt (or chain) 54 is wound around the intermediate pulley 52 and a pulley 53 secured to the output shaft of the motor 51. All the components are concealed by a cover 55. Supporting posts 56 extend vertically and downwardly from the under side of the base frame 50a through the top groove 14 into the interior of the track 10 as best shown in FIGS. 1 and 2. A wheel supporting frame 58 is mounted to each post 56 via a pin 57a (FIG. 2). Each wheel supporting frame 58 supports driving wheels 59, first anti-rolling rollers 60 and second anti-rolling rollers 61. The driving wheels 59 are rotatably mounted on the frame 58 via bearings 65. A pulley (or sprocket) 63 is secured to each axle shaft 62 of the driving wheels 65 and a belt (or chain) 57 is wound around the pulleys 63 and the intermediate pulley 52. Thus, the power of the motor 51 is transmitted to the driving wheels 59 via the belt 54, intermediate pulley 52, belt 57 and pulleys 63 so that the driving wheels 59 can run on the inner surfaces (i.e. running surfaces 12a) formed on the bottom wall 12 to drive the cart 50 forward as shown by an arrow A. It is preferable to mount guiding wheels 64 on the front wheel supporting frame 58 for guiding the cart 50 along the track 10.

Then, the mutual action between the track 10 and the driving wheels 59, first anti-rolling rollers 60 and second anti-rolling rollers 61 will be described with reference to FIG. 2. The driving wheels 59 run on the inner surfaces 12a of the bottom wall 12 of the track 10. Each of the inner surfaces 12a of the bottom surface 12 is preferable to be slightly inclined at an angle α(e.g. 1–2°) so that the rainwater entered into the track 10 flows to the bottom groove 12b. The first anti-rolling rollers 60 run on the inner surfaces 11a of the side walls 11. The first anti-rolling rollers 60 can be so arranged that they always lightly contact with the inner walls 11a of the side walls 11 or they are spring urged against the inner walls 11a to prevent the rolling motion of the cart 50. In the embodiment shown, four first anti-rolling rollers 60 are mounted on the wheel supporting frame 58 at the opposite sides thereof. However, the number and the position of the first anti-rolling rollers 60 to be mounted can be properly determined. The second anti-rolling rollers 61 are also mounted on the wheel supporting frame 58 at the under side thereof on the extention of the posts 56 and arranged within the bottom groove 12b of the bottom wall 12. When single second anti-rolling roller 61 is mounted on each wheel supporting frame 58, the diameter of the roller 61 is formed slightly smaller than the width of the bottom groove 12b so as to contact either side wall of the bottom groove 12b when the cart 50 tends to roll in either direction. The number and the mounting position of the second anti-rolling rollers 61 can be also properly determined.

Figure 3:
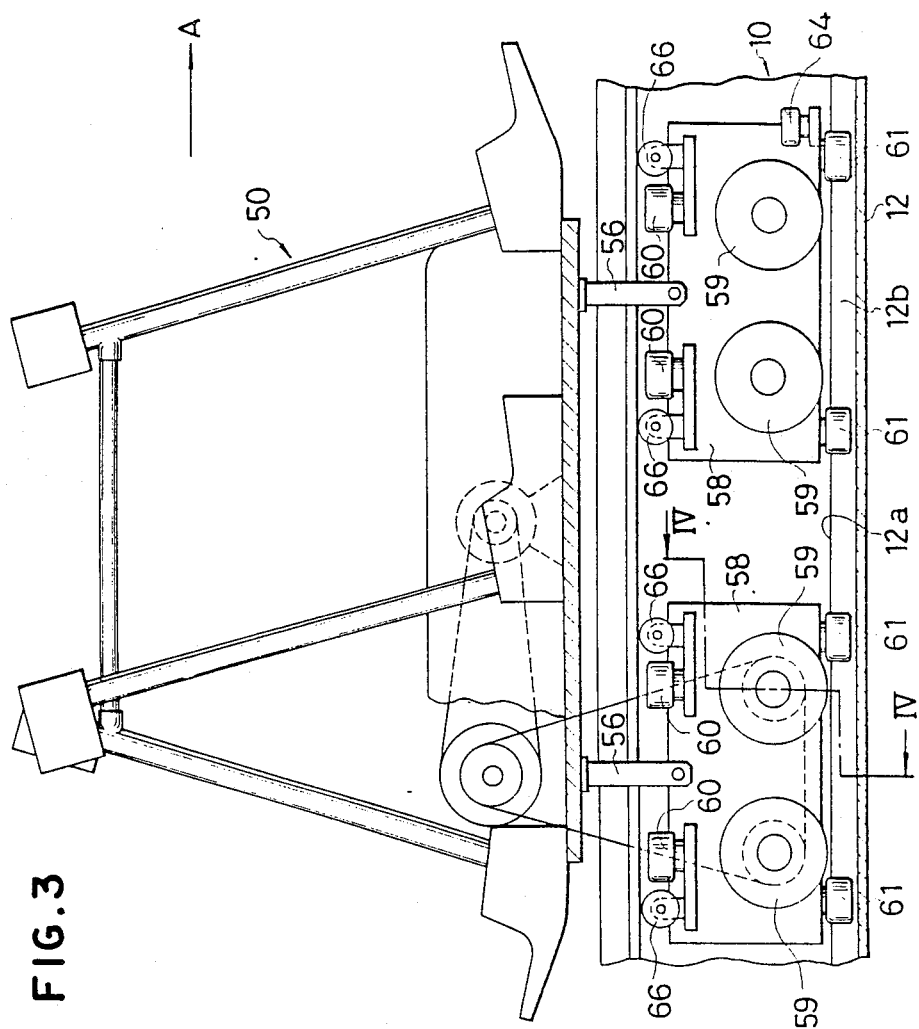
FIG. 3 is a cross-sectional side elevation of second embodiment of a golf cart system of the present invention.

A second embodiment of the present invention will be described with reference to FIGS. 3 and 4. A first difference in the golf cart system of the second embodiment from the first embodiment is that it is provided with anti-pitching rollers 66 in addition to the first and second anti-rolling rollers 60, 61. The anti-pitching rollers 66 prevent the pitching motion of the cart 50 when it travels along the terrain of a golf course. The anti-pitching rollers 66 are especially useful for a golf cart system which is installed in a golf course abundant in ups and downs. The anti-pitching rollers 66 are mounted on the top of the wheel supporting frame 58 and are adapted to run on the inner surfaces 13a of the top walls 13. It is preferable to provide a slight gap between the rollers 66 and the inner surfaces 13a of the top walls 13 or to slightly urge the rollers 66 against the inner surfaces 13a so as to prevent a generation of excessive friction therebetween.

A second difference in the golf cart system of the second embodiment from the first embodiment is that each wheel supporting frame 58 is provided with two second anti-rolling rollers 61 as shown in FIG. 6. The two rollers 61 can be mounted on opposite ends of a lever 70 pivotably mounted on the wheel supporting frame 58. A spring 72 is wound around a pivotal shaft 71 of the lever 70 to rotate the lever 70 in one direction (e.g. a direction shown by an arrow B) and to urge the rollers 61 against the side walls of the bottom groove 12b of the bottom wall 12.

Figure 4:
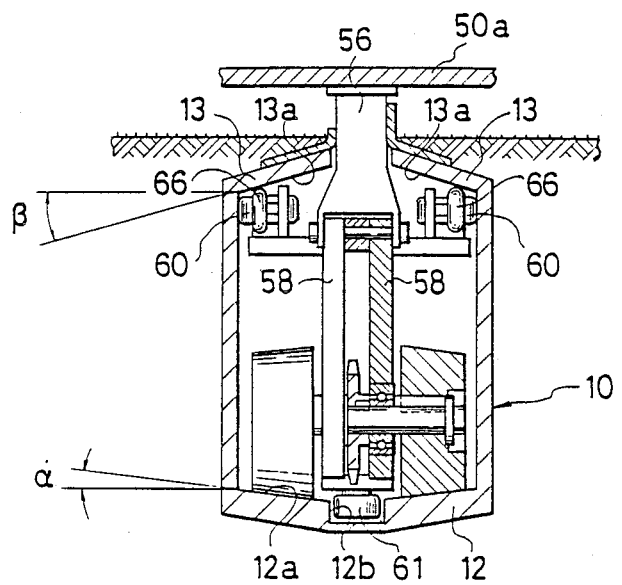
FIG. 4 is a cross-sectional view taken along the line IV—IV of FIG. 3.

In the tracks 10 shown in FIGS. 2 and 4, the inner surfaces 12a of the bottom wall 12 are provided with an inclination angle α and the inner surfaces 13a of the top walls 13 are provided with an inclination angle β. However, these inner surfaces 12a, 13a can be horizontally formed as shown in FIG. 5(a).

FIG. 7 shows modifications of the driving wheels 59 around which an elastic flat belt 73 or V-belts 73' are wound to increase the contacting area between the driving wheels 59 and the inner surfaces 12a of the bottom wall 12 and therefore to decrease the slip therebetween. The flat belt 73, preferably a cogged belt, is suitable for driving wheels of the straight cylinder as shown in FIG. 7(a). The V-belts 73' are suitable for driving wheels of tapered cylinder as shown in FIG. 7(b).

According to the golf cart of the present invention, since the width of the track exposed above the ground is very narrow, there is less chance of a golf ball hitting against the track. Even if a golf ball should happen to accidentally hit the exposed track portion, the ball will bounce similarly as when hitting natural grass if the exposed track portion is covered by elastic members such as artificial turf. This makes it possible to install the golf cart system of the present invention on the fairway of a golf course.

In addition, the rolling motion of the cart is effectively prevented by the first and second anti-rolling rollers. Especially, the provision of the second anti-rolling rollers enables to effectively prevent the rolling motion of the cart, since they are positioned furthest away from the center of gravity of the cart and can generate a large anti-rolling moment. Furthermore, since the first and second rollers do not act to cause an excessive friction load between the driving wheels and their running surfaces of the track, it is able to reduce the consumption of electric power or gasoline used by the power source and thus to increase the travelling distance of the cart per battery charge or tank of gasoline.

The pitching motion of the cart is also effectively prevented by the anti-pitching rollers. Thus the provision of the anti-pitching rollers makes it possible to install the golf cart system in a golf course abundant in hilly terrain.

What is claimed is:

1. A golf cart system comprising:
   a track adapted to be embedded in the ground, and
   a cart adapted to run on said track,
   said track including
      a generally horizontally extending bottom wall,
      two opposed side walls each generally vertically extending from said bottom wall,
      two top walls each extending from an upper end of each side wall toward a center of said track,
      a top groove defined between said two top walls, and
      a bottom groove defined between inner surfaces of said bottom wall,
   said cart including
      a base frame,
      two supporting posts extending vertically and downwardly from said base frame through said top groove into an interior of said track,
      a guiding wheel supporting frame and a driven wheel supporting frame being mounted on a different one of said supporting posts and being movable within said track and movable with respect to each other,
      drive means mounted on said base frame,
      driving wheels mounted on said driven wheel supporting frame being driven by said drive means from said base frame to run on the inner surfaces of said bottom wall of said track,
      first anti-rolling rollers mounted on said guiding wheel supporting frame and said driven wheel supporting frame to run on inner surfaces of said side walls,
      second anti-rolling rollers mounted on said guiding wheel supporting frame and said driven wheel supporting frame to run within said bottom groove of said bottom wall,
      anti-pitching rollers mounted on said guiding wheel supporting frame and said driven wheel supporting frame to run on inner surfaces of said two top walls, and
      guiding wheels mounted on a front end of said guiding wheel supporting frame for guiding said cart along said track.

* * * * *